US012583952B2

(12) United States Patent
Milan et al.

(10) Patent No.: US 12,583,952 B2
(45) Date of Patent: Mar. 24, 2026

(54) RUBBER COMPOSITION AND TIRE

(71) Applicant: The Goodyear Tire & Rubber Company, Akron, OH (US)

(72) Inventors: Marie-Laure Stéphanie Milan, Bertrange (LU); Jérôme Joel Daniel Delville, Réhon (FR); Pascal Patrick Steiner, Vichten (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 631 days.

(21) Appl. No.: 18/065,659

(22) Filed: Dec. 14, 2022

(65) Prior Publication Data

US 2024/0199772 A1 Jun. 20, 2024

(51) Int. Cl.

| | |
|---|---|
| ***C08F 36/06*** | (2006.01) |
| ***B60C 1/00*** | (2006.01) |
| ***C08F 36/08*** | (2006.01) |
| ***C08F 212/08*** | (2006.01) |
| ***C08K 3/36*** | (2006.01) |
| ***C08K 5/01*** | (2006.01) |
| ***C08K 5/548*** | (2006.01) |

(52) U.S. Cl.

CPC ............ *C08F 36/06* (2013.01); *B60C 1/0016* (2013.01); *C08F 36/08* (2013.01); *C08F 212/08* (2013.01); *C08K 3/36* (2013.01); *C08K 5/01* (2013.01); *C08K 5/548* (2013.01); *B60C 2200/04* (2013.01); *C08K 2201/006* (2013.01)

(58) Field of Classification Search

CPC ........ C08F 36/06; C08F 36/08; C08F 212/08; C08K 3/36; C08K 5/01; C08K 5/548

USPC .......................................................... 524/492

See application file for complete search history.

(56) References Cited

U.S. PATENT DOCUMENTS

| | | | | |
|---|---|---|---|---|
| 10,767,034 | B2 * | 9/2020 | Steiner | B60C 11/0008 |
| 10,947,368 | B2 | 3/2021 | Isitman et al. | |
| 11,214,667 | B2 * | 1/2022 | Steiner | C08L 91/00 |
| 11,440,350 | B2 | 9/2022 | Jacoby et al. | |
| 11,441,021 | B2 | 9/2022 | Steiner et al. | |
| 2015/0107735 | A1 * | 4/2015 | Djelloul-Mazouz | B60C 11/0058 152/209.1 |
| 2020/0071506 | A1 * | 3/2020 | Steiner | C08L 91/00 |
| 2021/0032442 | A1 * | 2/2021 | Steiner | B60C 1/0016 |
| 2021/0102047 | A1 | 4/2021 | Jacoby et al. | |
| 2021/0179822 | A1 | 6/2021 | Martter et al. | |
| 2021/0229494 | A1 * | 7/2021 | Whyte | C08L 15/00 |
| 2023/0383101 | A1 | 11/2023 | Kawakami | |

FOREIGN PATENT DOCUMENTS

CN 114752125 A 7/2022

OTHER PUBLICATIONS https://www.chembroad.com/c5-c9-resin-properties-applications-and-benefits/#:~:text=C5%20C9%20resin%20is%20also,durability%20of%20the%20final%20product. (Year: 2024).*

Borsodi et al., Vegetable Oils: Possible New Plasticizers in the Rubber Industry, Materials Science and Engineering, vol. 45, No. 1, pp. 20-28. (Year: 2020).*

Extended European Search Report for Application No. 23215777.6, dated Apr. 25, 2024.

* cited by examiner

*Primary Examiner* — Deve V Hall

(74) *Attorney, Agent, or Firm* — Mandy B. Willis

(57) ABSTRACT

The present invention is directed to a rubber composition comprising 30 to 80 phr of a first styrene butadiene rubber having a glass transition temperature lower than −50° C.; 10 to 40 phr of a second styrene butadiene rubber having a glass transition temperature higher than −45° C.; and 10 to 30 phr of a further rubber selected from the list of synthetic polyisoprene, natural rubber and polybutadiene. Furthermore, the rubber composition comprises 80 phr to 140 phr of silica and 40 phr to 90 phr of a hydrocarbon resin having a glass transition temperature of at least 30° C. and being selected from the group of C5 resins and C5/C9 resins. The present invention is also directed to a tire comprising such a rubber composition.

20 Claims, No Drawings

RUBBER COMPOSITION AND TIRE

FIELD OF THE INVENTION

The present invention is directed to a rubber composition, in particular to a tread rubber composition and to a tire comprising such a rubber composition.

BACKGROUND OF THE INVENTION

While the tire industry has provided over the past decades tires with constantly improving performance, it is also a desire to provide such tires cost-efficiently to limit costs for the customer. Thus, while it is in many applications possible to provide tires with very advanced performance, such a performance increase comes often together with a notable cost increase. There is a desire to provide good-performing tires at moderate costs. Although progress has been made in this area, room for improvement remains.

SUMMARY OF THE INVENTION

One object of the present invention may be to provide an advanced rubber composition, in particular a tread rubber composition for summer tires, having advanced wet grip properties.

Another object of the present invention may be to provide a cost effective rubber composition, in particular a tread rubber composition for summer tires, such as high performance (HP) or ultra-high performance (UHP) summer tires.

Yet another object of the present invention may be to provide a rubber composition which can be provided at limited costs and advanced wet grip performances, preferably with good rolling resistance and/or abrasion properties.

The present invention is defined by the scope of appended claim 1. Preferred embodiments are provided by the dependent claims and in the summary hereinbelow.

Thus, in a first aspect, the present invention is directed to a rubber composition comprising:

30 to 80 phr of a first styrene butadiene rubber having a glass transition temperature lower than −50° C., 10 to 40 phr of a second styrene butadiene rubber having a glass transition temperature higher than −45° C., and 10 to 30 phr of a further rubber selected from the list of synthetic polyisoprene, natural rubber and polybutadiene. Moreover, the rubber composition comprises 80 phr to 140 phr of silica, and 40 phr to 90 phr of a hydrocarbon resin having a glass transition temperature of at least 30° C. and being selected from one or more of C5 resins and C5/C9 resins.

The above combination of three rubber types, a moderate amount of silica and the claimed resin type supports an advanced wet traction at moderate costs.

In one embodiment, the resin has a glass transition temperature within a range of 30° C. and 55° C.

In another embodiment, the resin has an aromaticity of less than 20%, or, in other words, the amount of aromatic protons determined by NMR is less than 20% (of all protons). Preferably, said amount is within a range of 5% and 15%, or within a range of 10% and 15%. In addition or alternatively, the resin may be a C9 modified C5 resin. In other words, the resin may be described as a C5 resin which has been functionalized, coupled or modified with at least one aromatic group.

In another embodiment the resin is at least partially or fully hydrogenated.

In still another embodiment, the resin has a majority of dicyclopentadiene, cyclopentadiene and methylcyclopentadiene units. In particular, it may optionally be aromatically modified (in other words C9 modified), and/or partially or fully hydrogenated.

In still another embodiment, the resin is a C5/C9 resin, optionally having less than 40 weight % of dicyclopentadiene, cyclopentadiene and methylcyclopentadiene units.

In still another embodiment, the resin is non-hydrogenated.

In yet another embodiment, the first styrene butadiene rubber has a glass transition temperature within a range of −55° C. and −87° C. Preferably, the first styrene butadiene rubber is a solution-polymerized styrene butadiene rubber. In addition, or alternatively, the second styrene butadiene rubber has a glass transition temperature within a range of −10° C. and −40° C., which is preferably also a solution-polymerized styrene butadiene rubber.

In another embodiment, one or more of the first styrene butadiene rubber and the second styrene butadiene rubber are functionalized for the coupling to silica. Such functionalization can for instance be present at one or more chain ends and/or mid-chain.

In yet another embodiment, the styrene butadiene rubber has one or more groups selected from hydroxy, carboxy, siloxane, siloxy, silanol, alkoxy, epoxy, amine, imine functional groups.

In still another embodiment, the further rubber is selected from polyisoprene and natural rubber, preferably it is natural rubber.

In still another embodiment, the rubber composition comprises at least 5 phr (preferably 10 phr) more of the second styrene butadiene rubber than the amount of the further rubber, and at least 5 phr (preferably 10 phr) more of the first styrene butadiene rubber than the amount of the second styrene butadiene rubber, all by weight, or phr respectively.

In still another embodiment, the rubber composition comprises from 105 phr to 140 phr of silica, preferably from 105 phr to 130 phr of silica, or from 120 phr to 140 phr, preferably from 120 to 130 phr of silica. The silica preferably comprises or consists of precipitated silica and/or rice husk ash silica.

In still another embodiment, the rubber composition comprises from 55 phr, preferably from 60 phr to 80 phr, preferably to 75 phr of the resin.

In yet another embodiment, the silica has a BET surface areas within a range of 100 $m^2/g$ to 175 $m^2/g$, preferably within a range of 130 $m^2/g$ to 170 $m^2/g$. In addition or alternatively, the rubber composition comprises further a silane which is a bis-polyalkoxysilylalkyl polysulfide, preferably one or more of bis-triethoxysilylpropyl disulfide and bis-triethoxysilylpropyl tetrasulfide. While the rubber composition may also comprise other silanes such as mercapto silanes, e.g. 3-Octanoylthio-1-propyltriethoxysilane, the suggested resins are relatively cost effective. The same applies to the claimed silica type.

In another embodiment, the rubber composition comprises, optionally from 0.5 phr to 5 phr, of processing aids, such as salts of fatty acids and/or fatty acid soaps, which may include one or more of zinc soaps of fatty acids, fatty acid amides, amino acid derivatives, and calcium fatty acid soaps.

In another embodiment, the resin has one or more of the following properties:

i) a softening point within a range of 80° C. to 99° C., preferably within a range of 85° C. and 95° C.;

ii) a glass transition point within a range of 35° C. and 50° C.;

iii) a weight average molecular weight (Mw) of at least 1300 g/mol, preferably up to 2000 g/mol or up to 1900 g/mol;

iv) an amount (or in other words content or percentage) of aromatic protons of 10% to 15%, as determined by NMR;

v) an amount (or in other words content or percentage) of 1% to 5% of olefinic protons, as determined by NMR;

vi) an amount (or in other words content or percentage) of 80% to 90% of aliphatic protons, as determined by NMR; and vii) a z-average molecular weight (Mz) of at least 3000 g/mol, preferably up to 4000 g/mol.

In another embodiment, the rubber composition comprises 40 phr to 60 phr of the first styrene butadiene rubber optionally having a glass transition temperature within a range of −55° C. and −87° C.; 20 phr to 40 phr of the second styrene butadiene rubber optionally having a glass transition temperature within a range of −10° C. and −40° C.; and 10 to 30 phr of one or more of synthetic polyisoprene and natural rubber, preferably natural rubber. Preferably, the rubber composition comprises further 105 phr to 140 phr of silica and/or 55 phr to 80 phr of the hydrocarbon resin which is a C5/C9 resin having an aromaticity of less than 20%, which is the amount of aromatic protons determined by NMR.

In yet another embodiment, the rubber composition comprises from 1 phr to 10 phr of a liquid plasticizer, such as an oil or a liquid diene-based polymer. Liquid means herein that a material is in a liquid state at 23° C.

In yet another embodiment, the liquid plasticizer is a vegetable oil, preferably having a glass transition temperature within a range of −85° C. and −105° C., or even more preferably within a range of −90° C. and −105° C.

In another embodiment, one or more emulsion polymerization derived styrene/butadiene rubbers (ESBR) might be used having a styrene content of 20 to 28 percent bound styrene or, for some applications, an ESBR having a medium to relatively high bound styrene content, namely, a bound styrene content of 30 to 45 percent. In many cases the ESBR will have a bound styrene content which is within the range of 26 percent to 31 percent. By emulsion polymerization prepared ESBR, it may be meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer may also be contemplated as diene-based rubbers.

In another embodiment, solution polymerization prepared styrene butadiene rubbers (SSBR) may be used. Such an SSBR may for instance have a bound styrene content in a range of 5 to 50 percent, preferably 9 to 36, percent, and most preferably 26 to 31 percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organolithium compound as the initiator. In still another embodiment, the solution styrene butadiene rubber is a tin-coupled polymer. In still another embodiment, the SSBR is functionalized for improved compatibility with silica. In addition, or alternatively, the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene.

In one embodiment, a synthetic or natural polyisoprene rubber may be used. Synthetic cis-1,4-polyisoprene and natural rubber are as such well known to those having skill in the rubber art. In particular, the cis 1,4-microstructure content can be at least 90% and is typically at least 95% or even higher.

In one embodiment, cis-1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from −95° C. to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

A glass transition temperature, or Tg, of an elastomer represents the glass transition temperature of the respective elastomer in its uncured state. A glass transition temperature of an elastomer composition represents the glass transition temperature of the elastomer composition in its cured state. A Tg is determined as a peak midpoint by a differential scanning calorimeter (DSC) at a temperature rate of increase of 20° C. per minute, according to ASTM D3418 or equivalent.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr, of one or more additional diene-based rubbers, such as SBR, SSBR, ESBR, PBD/BR, NR and/or synthetic polyisoprene. In another example, the composition may include less than 5 phr, preferably less than 3 phr, of an additional diene-based rubber or be also essentially free of such an additional diene-based rubber. The terms "compound" and "composition" and "formulation" may be used herein interchangeably, unless indicated otherwise. The terms "rubber" and "elastomer" may also be used herein interchangeably.

Molecular weights of elastomers/rubbers or resins, such as Mn (number average molecular weight), Mw (weight average molecular weight) and Mz (z average molecular weight), are determined herein using gel permeation chromatography (GPC) according to ASTM 5296-11 using polystyrene calibration standards, or equivalent.

A Tg for resins is determined as a peak midpoint by a differential scanning calorimeter (DSC) at a temperature rate of increase of 10° C. per minute, according to ASTM D6604 or equivalent. Preferably, the resin has a softening point above 70° C. as determined by ASTM E28 which might sometimes be referred to as a ring and ball softening point.

In another embodiment, the resin is a petroleum hydrocarbon resin. Petroleum resins include both aromatic and nonaromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include any C5 species (olefins and diolefines containing an average of five carbon atoms or five carbon atoms) such as cyclopentadiene, dicyclopentadiene, diolefins such as isoprene and piperylene, and any C9 species (olefins and diolefins containing an average of 9 carbon atoms or 9 carbon atoms) such as vinyltoluene, alphamethylstyrene and indene. Such resins are made by any mixture formed from C5 and C9 species mentioned above, and are known as C5/C9 resins, or in other words C5/C9 copolymer resins.

In an embodiment, C5 resins are aliphatic resins made from one or more of the following monomers: 1,3-pentadiene (e.g., cis or trans), 2-methyl-2-butene, cyclopentene, cyclopentadiene, and dicyclopentadiene. Preferably C5 resins herein include less than 50% dicyclopentadiene.

In an embodiment C5/C9 (copolymer) resins are resins made from one or more of the following aliphatic monomers: 1,3-pentadiene (e.g., cis or trans), 2-methyl-2-butene, cyclopentene, cyclopentadiene, and dicyclopentadiene; and one or more of the following aromatic monomers: indene, methylindene, vinyl toluene, styrene and methylstyrene (such as alpha-methylstyrene).

Preferably, the present invention does not encompass (pure) C9 resins which are made from one or more aromatic monomers, preferably chosen from the group of indene, methylindene, vinyl toluene, styrene and methylstyrene (such as alpha-methylstyrene).

In still another embodiment, the present invention comprises a C9 modified C5 resin, wherein the C5 resin has been modified or functionalized with one or more aromatic monomers, preferably chosen from the group of indene, methylindene, vinyl toluene, styrene and methylstyrene (such as alpha methylstyrene). However, the majority of the monomers and/or (repeat) units of the resin are C5.

In still another embodiment, the present invention comprises a C5/C9 resin, which is a C9 modified C5 resin, wherein the C5 resin has been modified or functionalized with one or more aromatic monomers, preferably chosen from the group of indene, methylindene, vinyl toluene, styrene and methylstyrene (such as alpha methylstyrene). However, the majority of the monomers and/or (repeat) units of the resin are C5.

Preferably, the rubber composition does not comprise one or more of C9 resins, terpene resins, terpene-phenol resins, styrene/alphamethylstyrene resin, novolac resins, phenolic resins.

In one embodiment, the resin is partially or fully hydrogenated.

In an embodiment, the rubber composition comprises oil, such as processing oil. Oil may be included in the rubber composition as extending oil typically used to extend elastomers. Oil may also be included in the rubber composition by addition of the oil directly during rubber compounding. Oil used may include both extending oil present in the elastomers, and (process) oil added during compounding. Suitable oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils. If used, the rubber composition may also include up to 70 phr of processing oil, preferably between 5 phr and 25 phr. Or can be, alternatively up to 10 phr of oil, preferably less than 5 phr.

Glass transition temperatures Tg for oils are determined as a peak midpoint by a differential scanning calorimeter (DSC) at a temperature rate of increase of 10° C. per minute, according to ASTM E1356, or equivalent.

In an embodiment, the rubber composition comprises silica. Silica may be for instance pyrogenic/fumed or precipitated silica. In preferred embodiments, precipitated silica is used. Silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. The BET surface area is determined according to ASTM D6556 or equivalent and is described in the Journal of the American Chemical Society, Volume 60, Page 304 (1930). Silica may also be characterized by having a dibutylphthalate (DBP) absorption value in a range of 100 $cm^3$/100 g to 400 $cm^3$/100 g, alternatively 150 $cm^3$/100 g to 300 $cm^3$/100 g which is determined according to ASTM D 2414 or equivalent. Silica may have an average ultimate particle size, for example, in the range of 0.01 to 0.05 micron as determined by the electron microscope, although the silica particles may be even smaller, or possibly larger, in size. Various commercially available silicas may be used, such as, only for example herein, and without limitation, silicas commercially available from PPG Industries under the Hi-Sil trademark with designations 210, 315G, EZ160G, etc; silicas available from Solvay, with, for example, designations of Z1165MP and Premium200MP, etc.; and silicas available from Evonik AG with, for example, designations VN2 and Ultrasil 6000GR, 9100GR, etc.

In still another embodiment, the rubber composition may comprise pre-silanized and/or hydrophobated silica which may for instance have a CTAB adsorption surface area of between 130 m2/g and 210 $m^2$/g.

Some non-limiting examples of pre-treated silicas (i.e., silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries.

In an embodiment, the rubber composition may include carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 g/kg to 145 g/kg and a DBP number ranging from 34 cm3/100 g to 150 cm3/100 g. Iodine absorption values are determined according to ASTM D1510 or equivalent. Commonly employed carbon blacks can be used as a conventional filler. The content of carbon black is at most 10 phr, preferably less than 8 phr or less than 4 phr. Typically, the carbon black content is at least 0.1 phr.

In one embodiment, the rubber composition may contain sulfur containing organosilicon compounds or silanes. Examples of suitable sulfur containing organosilicon compounds are of the formula:

$$Z—Alk—S_n—Alk—Z \qquad \text{I}$$

in which Z is selected from the group consisting of

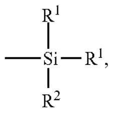 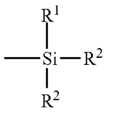 and 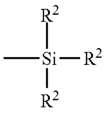

where $R^1$ is an alkyl group of 1 to 4 carbon atoms, cyclohexyl or phenyl; $R^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

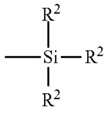

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C({=}O)—S—CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 phr to 20 phr. In one embodiment, the amount will range from 5 phr to 15 phr.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively within a range of 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire (or in other words tire components). For example, the rubber component may be a tread (including tread cap and/or tread base), sidewall, apex, chafer, sidewall insert, wirecoat or innerliner, preferably a tread.

In a second aspect, the present invention is directed to a tire comprising the rubber composition according to the first aspect and/or one or more of the above mentioned embodiments.

In one embodiment, the tire has a tread comprising the rubber composition.

The tire of the present invention can for example be a pneumatic tire or nonpneumatic tire, a race tire, a passenger tire, an aircraft tire, an agricultural tire, an earthmover tire, an off-the-road (OTR) tire, a truck tire, or a motorcycle tire. The tire may also be a radial or bias tire.

Vulcanization of the pneumatic tire of the present invention may for instance be carried out at conventional temperatures ranging from 100° C. to 200° C. In one embodiment, the vulcanization is conducted at temperatures which are within a range of 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In another embodiment, the tire is one or more of a passenger car tire, a summer tire, a radial tire, and a pneumatic tire.

In another embodiment, the tread has a tread cap comprising multiple tread cap layers arranged radially above each other, wherein the rubber composition is provided in a radially outermost tread cap layer.

The features of the above aspects and embodiments may be combined with one another.

DETAILED DESCRIPTION OF THE INVENTION

In accordance with non-limiting embodiments of the invention, the inventors have prepared rubber compositions according to Inventive Examples 1 to 3 and compared them with the rubber compositions according to Comparative Examples 1 and 2 (which are not within the scope of the present invention). These example compositions are listed in below Table 1.

Comparative Example 1 is a summer tread rubber compound comprising a solution-polymerized styrene butadiene rubber in combination with a natural rubber and a polybutadiene rubber. The solution-polymerized styrene butadiene rubber is oil-extended. Further, this composition comprises additional plasticizers, such as a terpene resin and additional free oil. Moreover, said composition comprises a phenol furaldehyde resin. The filler is essentially silica based with a minor amount of carbon black.

Comparative Example 2 comprises only two diene-based elastomers, i.e., a hydroxy functionalized, solution-polymerized styrene butadiene rubber in combination with natural rubber. As resin the rubber composition comprises only a C9 modified C5 resin, in combination with 4 phr of vegetable oil.

In contrast to the Comparative Examples 1 and 2, the Inventive Examples 1 to 3 comprise each a blend of two solution-polymerized styrene butadiene rubbers, wherein a first one has a relatively high Tg and a second one has a relatively low Tg. Moreover, Inventive Examples 1-3 rely on relatively large amounts of aromatically modified C5 resins (considered herein to fall within the group of C5/C9 resins). Both solution polymerized styrene-butadiene rubbers are functionalized for the coupling to silica.

TABLE 1

| | Amounts [phr] | | | | |
|---|---|---|---|---|---|
| Ingredient | Comparative Example 1 | Comparative Example 2 | Inventive Example 1 | Inventive Example 2 | Inventive Example 3 |
| SSBR 1 [1] | 110 | 0 | 0 | 0 | 0 |
| SSBR 2 [2] | 0 | 80 | 60 | 48 | 65 |
| SSBR 3 [3] | 0 | 0 | 20 | 32 | 25 |
| Natural Rubber | 10 | 20 | 20 | 20 | 10 |
| PBD [4] | 10 | 0 | 0 | 0 | 0 |
| Resin 1 [5] | 22 | 0 | 0 | 0 | 0 |
| Resin 2 [6] | 0 | 62 | 67 | 62 | 0 |
| Resin 3 [7] | 0 | 0 | 0 | 0 | 62 |
| Resin 4 [8] | 2 | 0 | 0 | 0 | 0 |
| Rosin [9] | 2 | 0 | 0 | 0 | 0 |
| Oil 1 [10] | 4 | 0 | 0 | 0 | 0 |
| Oil 2 [11] | 0 | 4 | 4 | 4 | 4 |
| Silica [12] | 130 | 125 | 135 | 125 | 125 |
| Silane [13] | 13 | 12.5 | 13.5 | 12.5 | 12.5 |
| Antioxidants [14] | 4.6 | 5.5 | 5.5 | 5.3 | 5.5 |

TABLE 1-continued

| | Amounts [phr] | | | | |
|---|---|---|---|---|---|
| Ingredient | Comparative Example 1 | Comparative Example 2 | Inventive Example 1 | Inventive Example 2 | Inventive Example 3 |
| Waxes | 1.5 | 2.3 | 2.3 | 2.3 | 2.3 |
| Accelerators [15] | 5.6 | 4.6 | 4.6 | 5.6 | 5 |
| Reversion inhibitor [16] | 0 | 2.3 | 0 | 0 | 0 |
| Processing aids | 2 | 2 | 2 | 2 | 2 |
| Zinc oxide | 2.5 | 1.1 | 2.5 | 2.5 | 2.5 |
| Stearic Acid | 1 | 2 | 2.5 | 2.5 | 2.5 |
| Carbon Black [17] | 2 | 2 | 2 | 2 | 2 |
| Sulfur | 1.7 | 1 | 1.7 | 1.7 | 1.7 |

[1] solution polymerized styrene butadiene rubber as Sprintan ™ SE SLR 6430 from Trinseo, including an oil extension of 37.5 phr per 100 phr or rubber, with a Tg of about −34° C.;
[2] solution polymerized styrene butadiene rubber having a Tg of about −65° C. and being hydroxy functionalized, as Nipol ™ NS612 from Zeon;
[3] solution polymerized styrene butadiene rubber having a Tg of about −27° C., and being functionalized with alkoxysilane and amino groups, as HPR 355H from JSR;
[4] polybutadiene rubber having a Tg of −108° C., as Budene ™ 1223 from Goodyear;
[5] alpha terpene based resin having a Tg of about 70° C. and a weight average molecular weight of about 590 g/mol and an aromaticity of less than about 1%, as Dercolyte ™ A115 from DRT;
[6] C5/C9 resin having a Tg of about 41° C., a weight average molecular weight of 1500 g/mol, an aromaticity of about 12%, Mz of about 3500, and a softening point of about 90° C., as Oppera ™ PR 373 from Exxon Mobil;
[7] hydrogenated and C9 modified DCPD resin having a Tg of about 56° C., a weight average molecular weight of about 800 g/mol, an aromaticity level of about 10%, a softening point of about 100° C., as Oppera ™ 383 from Exxon Mobil;
[8] unreactive octyl phenol formaldehyde resin, having a Tg of about 40° C., as SP1068 from Akrochem;
[9] gum rosin having a softening point of about 78° C.;
[10] TDAE oil;
[11] vegetable oil having a Tg of about −97° C.;
[12] precipitated silica having a BET surface area of about 160 $m^2/g$, as Zeosil ™ 1165 MP from Solvay;
[13] bis-triethoxysilylpropyl disulfide as SI 266 from Evonik;
[14] phenylenediamine and dihydroquinolene types;
[15] including CBS and DPG; in case of comparative Example 2: TBBS and DPG;
[16] reversion inhibitor, as 1,6-bis(N,N-dibenzylthiocarbamoyldithio)hexane;
[17] 50% TESPT on 50% N330 carbon black carrier, i.e. 1 phr carbon black in total, as X50S from Evonik.

Further non-limiting Inventive Examples not explicitly shown in Table 1 include for instance different amounts of Oil 2, such as within a range of 2 phr to 5 phr, and/or different amounts and/or types of processing aids, such as of 1 phr to 5 phr, and/or amounts of resin, for instance within a range of 60 phr to 67 phr. Also, other SSBRs have been used such as a siloxy functionalized SSBR having a glass transition temperature of about −59° C.

Table 2 shows physical properties of the rubber compositions of Comparative Examples 1 and 2, as well as of Inventive Examples 1 to 3, as listed already in Table 1 herein above. As shown in Table 2, rebound tests have been carried out at low temperature which can be considered as an indicator for wet performance/grip, wherein lower values are better. As can be seen in Table 2, Inventive Examples 1 to 3 have considerably better wet indicators than the Comparative Examples. In particular, Inventive Example 2 has a very good indicator compared with the other Examples.

Moreover, tangent delta values are shown in Table 2, wherein lower values indicate lower hysteresis properties and help to predict rolling resistance of the rubber composition. While Inventive Example 1 has an increased tangent delta value compared to Comparative Example 2, it has still a better rebound value. The tangent delta values of Inventive Examples 2 and 3 are flat compared to Comparative Example 2 but the rebound values of Inventive Examples 2 and 3 are much better in comparison with Comparative Example 2.

With respect to abrasion, the Inventive Examples provide comparable abrasion values if compared to Comparative Example 1 but an increased abrasion compared to Comparative Example 2. However, all Inventive Examples have significantly improved wet properties. Moreover, it is noted that the number of ingredients is higher in Comparative Examples 1 and 2 compared to the Inventive Examples. This results amongst others in more complex processing and partially also in higher cost for preparing the rubber composition according to the Comparative Examples. This applies at least partially also to material costs.

In summary, the Inventive Examples exhibit advanced wet performance in combination with limited rolling resistance at a good abrasion level.

TABLE 2

| Test | Comparative Example 1 | Comparative Example 2 | Inventive Example 1 | Inventive Example 2 | Inventive Example 3 |
|---|---|---|---|---|---|
| Rebound [%] (0° C.) [a] | 7.9 | 7.7 | 7.0 | 6.3 | 6.6 |
| TanD (10%) [b] | 0.23 | 0.15 | 0.17 | 0.15 | 0.15 |
| Abrasion [c] | 100 | 122 | 95 | 96 | 110 |

[a] rebound test carried out at 0° C. on a Zwick Roell ™ 5109 rebound resilience tester according to DIN 53512 or equivalent, wherein smaller values are better and can indicate better wet grip properties;
[b] tangent delta obtained with an RPA 2000 ™ Rubber Process Analyzer of the company Alpha Technologies, at 100° C. and 1 Hz, based on ASTM D5289 or equivalent;
[c] abrasion measured according to DIN 53516, using a Zwick drum abrasion unit, model 6102 normalized to Comparative Example 1, wherein larger values are corresponding to less abrasion.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A rubber composition comprising:

30 to 80 phr of a first styrene butadiene rubber having a glass transition temperature lower than −50° C.;

10 to 40 phr of a second styrene butadiene rubber having a glass transition temperature higher than −45° C.;

10 to 30 phr of a further rubber selected from the list of synthetic polyisoprene, natural rubber and polybutadiene rubber;

80 phr to 140 phr of silica; and greater than 60 phr to 90 phr of a hydrocarbon resin having a glass transition temperature of at least 30° C. and being selected from one or more of C5 resins and C5/C9 resins.

2. The rubber composition according to claim 1, wherein the resin has a glass transition temperature within a range of 30° C. and 55° C.

3. The rubber composition according to claim 1, wherein the resin has an amount of aromatic protons of less than 20%, as determined by NMR.

4. The rubber composition according to claim 1, wherein the resin is a C5/C9 resin having less than 40 weight percent of dicyclopentadiene, cyclopentadiene and methylcyclopentadiene units.

5. The rubber composition according to claim 1, wherein the first styrene butadiene rubber has a glass transition temperature within a range of −55° C. and −87° C.

6. The rubber composition according to claim 1, wherein the second styrene butadiene rubber has a glass transition temperature within a range of −10° C. and −40° C.

7. The rubber composition according to claim 1, wherein one or more of the first styrene butadiene rubber and the second styrene butadiene rubber are functionalized for the coupling to silica.

8. The rubber composition according to claim 1, wherein the further rubber is selected from polyisoprene and natural rubber.

9. The rubber composition according to claim 1, comprising at least 5 phr more of the second styrene butadiene rubber than the amount of the further rubber, and at least 5 phr more of the first styrene butadiene rubber than the amount of the second styrene butadiene rubber, all by weight.

10. The rubber composition according to claim 1, comprising from 105 phr to 140 phr of silica.

11. The rubber composition according to claim 1, comprising from 55 phr to 80 phr of the resin.

12. The rubber composition according to claim 1, wherein the silica has a BET surface area within a range of 100 $m^2/g$ to 175 $m^2/g$; and wherein the rubber composition further comprises a silane which is a bis-polyalkoxysilylalkyl polysulfide.

13. The rubber composition according to claim 1, wherein the resin has one or more of the following properties:

i) a softening point within a range of 80° C. to 99° C.;

ii) a glass transition point within a range of 35° C. and 50° C.;

iii) a weight average molecular weight (Mw) of at least 1300 g/mol;

iv) an amount of aromatic protons of 10% to 15%, as determined by NMR;

v) an amount of olefinic protons of 1% to 5%, as determined by NMR;

vi) an amount of aliphatic protons of 80% to 90%, as determined by NMR; and vii) a z-average molecular weight (Mz) of at least 3000 g/mol.

14. The rubber composition according to claim 1 comprising 40 phr to 60 phr of the first styrene butadiene rubber having a glass transition temperature within a range of −55° C. and −87° C.;

20 phr to 40 phr of the second styrene butadiene rubber having a glass transition temperature within a range of −10° C. and −40° C.;

10 to 30 phr of one or more of synthetic polyisoprene and natural rubber, 105 phr to 140 phr of silica; and 55 phr to 80 phr of the hydrocarbon resin which is a C5/C9 resin having an amount of aromatic protons of less than 20%, as determined by NMR.

15. The rubber composition of claim 1, further comprising 1 phr to 10 phr of liquid plasticizer.

16. The rubber composition of claim 15, wherein the liquid plasticizer is a vegetable oil having a glass transition temperature within a range of −85° C. and −105° C.

17. A tire comprising the rubber composition according to claim 1.

18. The tire according to claim 17, wherein the tire has a tread comprising the rubber composition.

19. The tire according to claim 18, wherein the tire is one or more of a passenger car tire and a summer tire.

20. The tire according to claim 18, wherein the tread has a tread cap comprising multiple tread cap layers arranged radially above each other and wherein the rubber composition is provided in a radially outermost tread cap layer.

* * * * *